United States Patent [19]
Cornell, III

[11] 3,765,106
[45] Oct. 16, 1973

[54] TEACHING SYSTEM

[76] Inventor: Dudley E. Cornell, III, 221 San Pedro N. E., Albuquerque, N. Mex. 87108

[22] Filed: July 29, 1971

[21] Appl. No.: 167,147

[52] U.S. Cl. ................... 35/35 C, 179/100.2 MD
[51] Int. Cl. ........................ G09b 5/04, G11b 5/02
[58] Field of Search ............................ 35/35 C; 179/100.2 MD; 242/55.19 A

[56] References Cited
UNITED STATES PATENTS

| | | | |
|---|---|---|---|
| 3,269,671 | 8/1966 | Cole, Jr. | 242/55.19 A |
| 3,443,767 | 5/1969 | Liddle et al. | 242/55.19 A |
| 3,410,470 | 11/1968 | Metzner | 242/55.19 A |
| 3,640,479 | 2/1972 | Hata | 242/55.19 A |
| 3,299,538 | 1/1967 | Cooper | 35/35 C |
| 3,118,235 | 1/1964 | Ley | 35/35 C |
| 3,531,575 | 9/1970 | Kobler et al. | 35/35 C |
| 3,059,348 | 10/1962 | Mezzacappa | 35/35 C |
| 3,142,909 | 8/1964 | Irazoqui | 35/35 C |

*Primary Examiner*—Wm. H. Grieb
*Attorney*—Harry C. Alberts et al.

[57] ABSTRACT

A foreign language teaching system includes a lesson cassette unit which audibly reproduces lesson information in the form of correctly pronounced foreign language words to be learned at predetermined spaced-apart intervals of time, and a student repeater cassette unit having a magnetic tape and a recording head which permits a student to pronounce the lesson words after they are rendered audible by the lesson cassette and enables the student to record his voice on the tape. A playback head for the repeater cassette is disposed adjacent the tape spaced therealong from the recording head, and energizes a playback amplifier which in turn drives a speaker to audibly reproduce the student's voice before the next lesson word is rendered audible by the lesson cassette so that the student can listen to his own pronunciation of the word to be learned. Prior to the reproduction of the next lesson word by the lesson cassette, the preceding lesson word is again reproduced audibly for comparison purposes. The tape is an endless tape, and a permanent magnet disposed adjacent the tape between the recording head and the playback head erases the information from the tape after each word is reproduced by the playback head.

2 Claims, 4 Drawing Figures

PATENTED OCT 16 1973 3,765,106
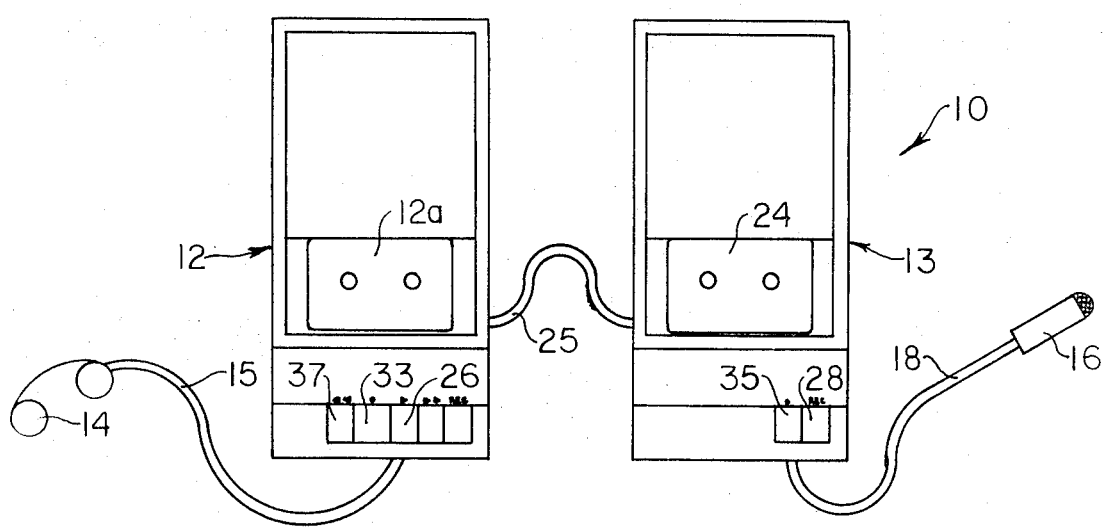
FIG 1
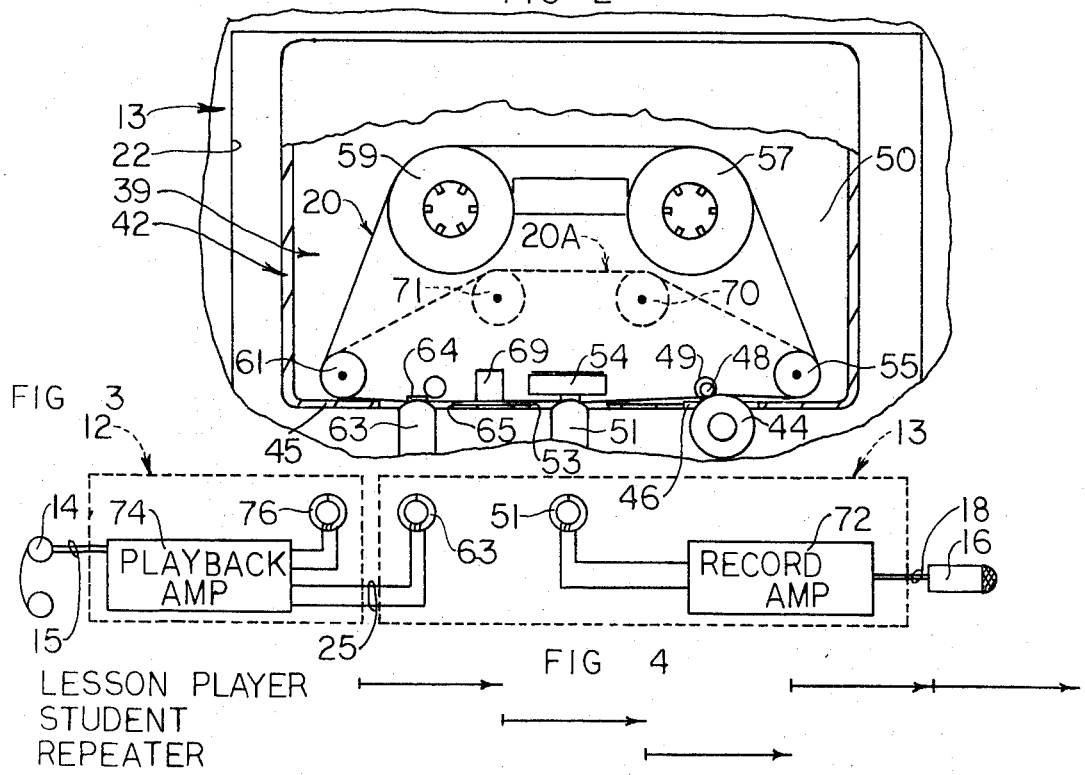
FIG 2
FIG 3
LESSON PLAYER
STUDENT
REPEATER
FIG 4
INVENTOR
DUDLEY E. CORNELL III
BY Alberts, Brezina + Lund
ATTORNEYS

TEACHING SYSTEM

This invention relates to a teaching system, and it more particularly relates to a foreign language teaching system for instructing a student to pronounce correctly foreign language words.

Teaching systems and devices have enabled students to learn the correct pronunciation of foreign language words. For example, phonograph records and tapes have been provided for the purpose of permitting a student to audibly reproduce the foreign language words to be learned on a conventional record player or tape recorder to permit the student to listen to the correct pronunciation of the words and to practice the pronunciation of the foreign language words. However, such a teaching device has not been entirely satisfactory for some applications, since the student cannot readily listen to and compare his pronunciation of the word with the correct pronunciation thereof. Therefore, it would be highly desirable to have a teaching system which audibly reproduces a student's pronunciation of a word for comparison purposes with the correct pronunciation thereof. In this regard, it would be highly desirable to have such a system which not only audibly reproduces a correctly pronounced foreign language word, but also permits the student to record and then listen to an audible reproduction of his pronunciation of the word immediately followed by an audibly reproduced correctly pronounced word for comparison purposes without the necessity of manipulating the system. Also, such a system should be highly reliable in operation and relatively inexpensive to manufacture.

Therefore, the principal object of the present invention is to provide a new and improved teaching system.

A further object of the present invention is to provide a new and improved foreign language teaching system, which enables a student to learn to correctly pronounce foreign language words by enabling the student to listen to an audibly reproduced correctly pronounced foreign language word, to immediately thereafter pronounce the word and record his voice, and to hear his voice audibly reproduced before again hearing the correctly pronounced word reproduced for comparison purposes and before hearing the next word to be learned without the necessity of manipulating the system during the operation thereof.

Briefly, the above and further objects are realized in accordance with the present invention by providing a teaching system, which includes a lesson player cassette unit for audibly reproducing correctly pronounced foreign language lesson words to be learned at predetermined time intervals, and a student repeater cassette unit having a magnetic tape and a recording head for permitting a student to pronounce the lesson words after they are rendered audible by the lesson cassette and for enabling the student-pronounced words to be recorded on the tape. A playback head for the repeater cassette is disposed adjacent the tape spaced therealong from the recording head, and energizes a speaker via a playback amplifier to audibly reproduce a repeated word before the next lesson word is rendered audible by the lesson cassette so that the student can listen to his own pronunciation of the word to be learned. Prior to the reproduction of the next lesson word by the lesson cassette, the preceding lesson word is again reproduced audibly for comparison purposes. Thus, the student can practice the lesson and devote his entire concentration to learning to pronounce the foreign words without manipulating the system. In one embodiment of the invention, the repeater cassette is connected to the playback amplifier of the lesson player cassette so that both the accurately pronounced lesson information and the student-pronounced information are audibly reproduced by the same earphones or other speaker.

The invention, both as to its organization and method of operation, together with further objects and advantages thereof will best be understood by reference to the following detailed description taken in connection with the accompanying drawings, wherein:

FIG. 1 is a partly schematic plan view of a teaching system, which is constructed in accordance with the principles of the present invention;

FIG. 2 is an enlarged, fragmentary view of the student repeater cassette unit with its tape compartment closure removed;

FIG. 3 is a schematic diagram of a portion of the electrical circuitry of the system of FIG. 1; and FIG. 4 is a timing diagram which indicates the sequence of events occurring during a cycle of operation of the system of FIG. 1.

Referring now to the drawings and more particularly to FIG. 1 thereof, there is shown a teaching system 10 which embodies principles of the present invention. The system 10 includes a lesson player cassette unit 12 having a cassette tape cartridge (not shown) which is operatively disposed within a compartment enclosed by a closure 12a, and which stores a series of prerecorded, correctly pronounced foreign language words to be learned at predetermined spaced-apart intervals along the tape of the cartridge, and a student repeater cassette unit 13 for recording and subsequently audibly reproducing the foreign language words pronounced by the student operator. A set of earphones 14 or other suitable speaker is electrically connected to the cassette unit 12 via a cable 15 to enable the student operator to listen to the foreign language words recorded on the tape of the unit 12, and a microphone 16 is electrically connected to the cassette unit 12 by means of a cable 18 so that the student can pronounce each word immediately after hearing it audibly reproduced by the unit 12 and record his voice on an endless magnetic tape 20 (FIG. 2) operatively mounted within a compartment 22 enclosed by a closure 24. A cable 25 connects the electrical portion of the unit 13 to the electrical portion of the unit 12 as hereinafter described in greater detail, whereby the student's voice is reproduced by the earphones 14 immediately prior to the audible reproduction of the same word by the lesson cassette unit 12 for comparison purposes and the next word to be learned. In operation, a "play" button 26 of the cassette unit 12 and a "record" button 28 of the unit 13 are pressed by the operator to initiate operation of the units. A correctly pronounced foreign language word is then audibly reproduced by means of the earphones 14 and the cassette unit 12, and the student operator immediately thereafter speaks the word into the microphone 16 to record his voice on the endless magnetic tape 20. After a predetermined time delay interval, the student-pronounced word is reproduced from the endless tape 20 and transferred to the lesson player cassette unit 12 via the cable 25 to cause the repeated word to be audibly reproduced by the earphones 14. Immediately thereafter, the same correctly pronounced word is again audibly reproduced by the lesson player cassette unit 12 via the earphones 14 so that the student operator can compare his pronunciation of the word with an accurate pronunciation thereof. The next word to be learned is then reproduced by he unit 12 for the student operator to repeat, and after a series of lesson words are thus reproduced and repeated by the system 10, the operation is terminated by pressing the "stop" buttons 33 and 35 of the respective units 12 and 13. In order to repeat the lesson, a "rewind" button 37 of the unit 12 is provided for the purpose of initiating a rewinding cycle of operation of the tape of the unit 12. It should be noted that by employing the system of the present invention, many different lessons may be prerecorded on cassette tape cartridges so that a variety of lessons may be employed. Also, it should be understood that except for a portion of the electrical circuitry of the cassette unit 12 as hereinafter described in detail, the cassette unit 12 is a conventional cassette recorder, which, if desired, may also be used for other purposes.

Considering now the student repeater cassette unit 13 in greater detail with reference to FIGS. 2 and 3 of the drawings, the cassette unit 13 includes a tape drive mechanism 39 enclosed within a cartridge housing 42, which in turn is disposed within the compartment 22 of the unit 13. A roller 44 extends through an opening 46 in the front wall 45 of the housing 42 and presses the tape 20 into engagement with a motor-driven capstan 48 which extends through a hole 49 in the bottom wall 50 of the housing 42 to drive the tape in a counter-clockwise direction, as viewed in FIG. 2, in a closed-loop path. A recording head 51 extends through an opening 53 in the front wall 45 to engage the tape 20 and press it against a back-up member 54 within the housing 42, and responds to the microphone 16 for the purpose of recording the student's voice on the tape 20. A guide roller 55 guides the tape 20 from the head 51 via the roller 44 to a pair of spaced-apart large guide rollers 57 and 59 and thence to a small guide roller 61. A playback head 63 extends partially within an opening 65 in the front wall 45 near the small roller 61 and presses the tape against a back-up member 64 within the housing 42 to read or pick up the foreign language words recorded on the tape 20 by the student operator. A permanent magnet 69 is disposed between the playback head 63 and the recording head 51 within the housing 42 and engages the inside surface of the tape 20 as it moves from the playback head 63 to erase the information recorded thereon. It should be understood that other types of magnetic erase means, such as an electromagnet, may also be employed to erase the tape 20.

A pair of spaced-apart auxiliary guide rollers 70 and 71 are mounted on the bottom wall 50 in a position intermediate the large rollers 57 and 59 and the small rollers 55 and 61 and cooperate with the rollers 55 and 61 to guide a smaller-sized loop of tape indicated in dotted-line form at 20A so that, if desired, a shorter time delay between recording the student's voice and playing it back may be provided. Moreover, a longer time delay may be achieved by providing a larger-sized loop of tape (not shown) and additional auxiliary rollers (not shown) which are disposed to the rear of the large rollers 57 and 59 and which cooperate with the rollers 55 and 61. Also, in order to adjust the delay time, other sizes of loops of tape may be employed and loosely wrapped about any given set of guide rollers, since the tape need not be tightly entrained about the rollers as illustrated in drawings and may have a substantial slack portion. For example, using a larger loop of tape (not shown) to enclose loosely the large rollers 57 and 59 and the small rollers 55 and 61, a substantial slack portion of the loop exists to the rear of the forward rollers 55 and 61 to provide a longer time delay. The time for one complete cycle of the tape may range from three seconds to 30 seconds, but a cycle of 4.8 seconds is preferred.

The tape drive mechanism is adapted to be removed from the compartment 22 as a cartridge unit in a manner similar to a tape cartridge for a conventional cassette recorder, so that, if desired, the mechanism 39 may be replaced with a similar one having a tape of a different length to cooperate with a corresponding cartridge lesson tape for the cassette unit 12. When the mechanism 39 is inserted into the compartment 22, the heads 51 and 63 and the roller 44 are first moved forward in accordance with known techniques to permit the housing 42 of the mechanism 39 to be positioned within the compartment 22 with the drive capstan 48 extending through the hole 49 and into the interior of the housing. Thereafter, the heads 51 and 63 and the roller 44 are moved rearwardly to engage the tape 22.

Referring now to FIG. 3, a recording amplifier 72 of the cassette unit 13 has its input connected to the microphone 16 by means of the cable 18 to amplify the information to be recorded on the tape 20, and has its output connected to the recording head 51. A playback amplifier 74 of the lesson player cassette unit 12 has one of its inputs connected via the cable 25 to the playback head 63 of the cassette unit 13, and it has another input connected to a playback head 76 for the unit 12 so that both the information recorded on the tape 20 and on the tape for the unit 12 are amplified by the amplifier 74 which in turn energizes the earphones 14. However, it is to be understood that the unit 13 may also be provided with its own playback amplifier so that a conventional cassette unit may be employed in place of the unit 12, or any other means of audibly reproducing the lesson information may be employed.

Referring to FIG. 4, a typical cycle of operation of the system 10 will now be described. To initiate a cycle of operation, the buttons 26 and 28 of the respective units 12 and 13 are pressed to activate the drive mechanisms for both units and to energize the recording amplifier 72 and the playback amplifier 74. The lesson player unit 12 and the earphones 14 then audibly reproduce the first lesson instruction word, such as "say the word 'bueno'." After the instruction is given, the student operator pronounces the word "bueno" and records his voice on the tape 20 by means of the recording head 51 in response to the microphone 16 and the recording amplifier 72. After the portion of the tape 20 bearing the recorded voice of the student is conveyed to the playback head 63, the student's voice is audibly reproduced by the earphones 14 in response to the playback head 63 and the playback amplifier 74 of the repeater cassete unit 13. Also, after the recorded word is picked up by the playback head 63, the recorded information is erased from the tape 20 by the magnet 69. The instructional tape of the lesson player unit 12 then audibly reproduces the word "bueno" again so that the student can compare the sound of his own pronunciation with the accurate pronunciation produced by the unit 12. The cycle is then repeated without the necessity of any manipulations by the student operator until the lesson is completed and the units 12 and 13 are deactivated by pressing the "stop" buttons 33 and 35 of the respective units 12 and 13.

While the present invention has been described in connection with the particular embodiment thereof, it will be understood that those skilled in the art may make many changes and modifications without departing from the invention. Accordingly, it is intended by the appended claims to cover all such changes and modifications as fall within the true spirit and scope of this invention.

I claim:

1. In a teaching system for language instruction, a student unit for recording a spoken word and then immediately reproducing that word, comprising: drive roller means including a capstan and a pinch roller for engaging magnetic tape with said capstan, recording head means, reproducing head means, means for energizing said recording head means to record on tape, means for reproducing signals developed by said reproducing head means to reproduce the recorded signals, a cassette type magnetic tape cartridge for disposition in said student unit and including a generally rectangular housing having a front wall, first and second rollers in said housing having axes in spaced parallel relation in a plane in spaced parallel relation to said front wall of said housing, said first and second rollers having peripheral portions in closely spaced relation to said front wall, an endless loop of student magnetic tape entrained on said roller means, said tape containing magnetic material throughout substantially the entire length thereof and including a portion extending from said first roller to said second roller along and in closely spaced relation to the inner surface of said front wall, additional roller means for guiding said tape from said second roller and back to said first roller with all portions of said tape being parallel to said axes throughout the length of said endless loop and with the length of said loop being substantially less than the perimeter of said rectangular housing, said front wall having a first opening for receiving said pinch roller to engage said tape with said capstan for drive of said tape from said first roller to said second roller and thence back around said additional roller means to said first roller, a second opening positioned opposite said recording head means between said first opening and said first roller and a third opening positioned opposite said reproducing head means between said second opening and said first roller, back-up means behind said second opening for engaging the inner surface of said tape for engagement of the outer surface of the tape with said recording head means, additional back-up means behind said third opening for engaging the inner surface of said tape for engagement of the outer surface of said tape with said reproducing head means, and a permanent magnet supported in said housing and engaged with a portion of said tape between said second and third openings, a cartridge of lesson tape having recorded thereon a series of words of lesson information, and a lesson unit for supporting said cartridge of said lesson tape and including reproducing head means for reproducing said series of words, said series of words being recorded on said lesson tape with an effective time interval therebetween at least three times as long as the time required for each portion of said student tape to move through the length of said endless loop thereof, and a second series of words being recorded on said lesson tape respectively identical to the first series of words, the time interval between each of said first series of words and the corresponding identical word of said second series being at least equal to twice as long as the time required for each portion of said student tape to move through the length of said endless loop thereof.

2. In a system as defined in claim 1, the time required for each portion of said student tape to move through the length of said endless loop thereof being on the order of five seconds.

* * * * *